United States Patent
Torgersrud

(10) Patent No.: US 10,003,698 B2
(45) Date of Patent: Jun. 19, 2018

(54) METHOD AND SYSTEM FOR FINANCING OF INMATE MOBILE DEVICES

(71) Applicant: Telmate LLC, San Francisco, CA (US)

(72) Inventor: Richard Torgersrud, San Francisco, CA (US)

(73) Assignee: Intelmate LLC, San Francisco, CA (US)

( * ) Notice: Subject to any disclaimer, the term of this patent is extended or adjusted under 35 U.S.C. 154(b) by 138 days.

(21) Appl. No.: 13/837,150

(22) Filed: Mar. 15, 2013

(65) Prior Publication Data

US 2014/0273929 A1    Sep. 18, 2014

(51) Int. Cl.
*H04M 15/00* (2006.01)
*H04M 1/725* (2006.01)
*H04W 4/24* (2018.01)

(52) U.S. Cl.
CPC ..... *H04M 15/886* (2013.01); *H04M 1/72572* (2013.01); *H04M 1/72577* (2013.01); *H04M 15/07* (2013.01); *H04M 15/09* (2013.01); *H04M 15/88* (2013.01); *H04W 4/24* (2013.01)

(58) Field of Classification Search
CPC ....... H04W 12/08; H04W 4/24; H04W 4/001; H04W 4/02; H04W 24/08; H04W 12/12; H04W 4/021; H04W 48/02; H04W 48/08; H04M 1/72577; H04M 15/705; H04M 1/72569; H04M 15/58; H04M 15/66; H04M 15/771; H04M 1/72572; H04M 15/886; H04M 15/88; H04L 12/1407
USPC ........ 455/405, 406, 407, 410, 411, 418–420, 455/565; 726/1–21
See application file for complete search history.

(56) References Cited

U.S. PATENT DOCUMENTS

| | | | |
|---|---|---|---|
| 8,712,407 B1* | 4/2014 | Cope et al. ................. | 455/426.1 |
| 8,811,582 B1* | 8/2014 | Torgersrud ............... | 379/114.21 |
| 2007/0060100 A1* | 3/2007 | Watler et al. ................. | 455/406 |
| 2008/0307339 A1* | 12/2008 | Boro et al. ..................... | 715/764 |
| 2011/0045811 A1* | 2/2011 | Kemery ......................... | 455/418 |
| 2012/0066738 A1* | 3/2012 | Cohan .............................. | 726/1 |
| 2012/0151047 A1* | 6/2012 | Hodges et al. ............... | 709/224 |
| 2013/0058469 A1* | 3/2013 | Gongaware et al. ...... | 379/93.03 |
| 2013/0143522 A1* | 6/2013 | Rege et al. .................... | 455/405 |
| 2013/0267196 A1* | 10/2013 | Leemet ................. | H04M 15/58 455/405 |
| 2014/0179263 A1* | 6/2014 | Collins et al. ................. | 455/405 |
| 2014/0179277 A1* | 6/2014 | Khan et al. ................... | 455/411 |
| 2014/0280559 A1* | 9/2014 | Torgersrud .................... | 709/204 |
| 2014/0280632 A1* | 9/2014 | Torgersrud et al. .......... | 709/206 |

OTHER PUBLICATIONS

Rent-2-Own, 2012, pp. 1, retrieved Oct. 15, 2014.*
National Rent-to-Own, 2013, pp. 2, retrieved Oct. 14, 2014.*

* cited by examiner

*Primary Examiner* — Magdi Elhag
(74) *Attorney, Agent, or Firm* — FBFK PC

(57) ABSTRACT

A method for financing a mobile device for an inmate involves receiving a plurality of mobile device rules comprising limitations on usage of the mobile device by the inmate within a controlled facility, receiving the mobile device, and installing, on the mobile device, a mobile application, wherein the mobile application conforms the mobile device to the plurality of mobile device rules. The method also involves receiving a payment for the mobile device, and executing, by the mobile device, the mobile application.

27 Claims, 8 Drawing Sheets

US 10,003,698 B2

METHOD AND SYSTEM FOR FINANCING OF INMATE MOBILE DEVICES

BACKGROUND

Controlled facilities, such as jails, prisons, secure detention environments, detention facilities, secured hospitals, or addiction treatment facilities, house large populations of individuals in confinement, which presents unique administrative challenges. In such detention environments, detained individuals, such as prisoners, offenders, convicts, military personnel, patients, government cleared personnel, or other detainees, frequently desire to communicate with individuals outside the detention environment such as friends or family members.

SUMMARY OF INVENTION

In general, in one aspect, the invention relates to a method for financing a mobile device for an inmate, comprising: receiving a plurality of mobile device rules comprising limitations on usage of the mobile device by the inmate within a controlled facility; receiving the mobile device; installing, on the mobile device, a mobile application, wherein the mobile application conforms the mobile device to the plurality of mobile device rules; receiving a payment for the mobile device; and executing, by the mobile device, the mobile application.

In general, in one aspect, the invention relates to a non-transitory computer-readable medium (CRM) storing a plurality of instructions for financing a mobile device for an inmate, the plurality of instructions comprising functionality to: receive a plurality of mobile device rules comprising limitations on usage of the mobile device by the inmate within a controlled facility; receive the mobile device; install, on the mobile device, a mobile application, wherein the mobile application conforms the mobile device to the plurality of mobile device rules; receive a payment for the mobile device; and execute the mobile application.

In general, in one aspect, the invention relates to a system for financing a mobile device for an inmate, comprising: a server, comprising functionality to: receive a plurality of mobile device rules comprising limitations on usage of the mobile device by the inmate within a controlled facility; receive the mobile device; receive a payment for the mobile device; the mobile device, comprising functionality to: install a mobile application, wherein the mobile application conforms the mobile device to the plurality of mobile device rules; and execute the mobile application.

Other aspects and advantages of the invention will be apparent from the following description and the appended claims.

DETAILED DESCRIPTION

Figure 1:
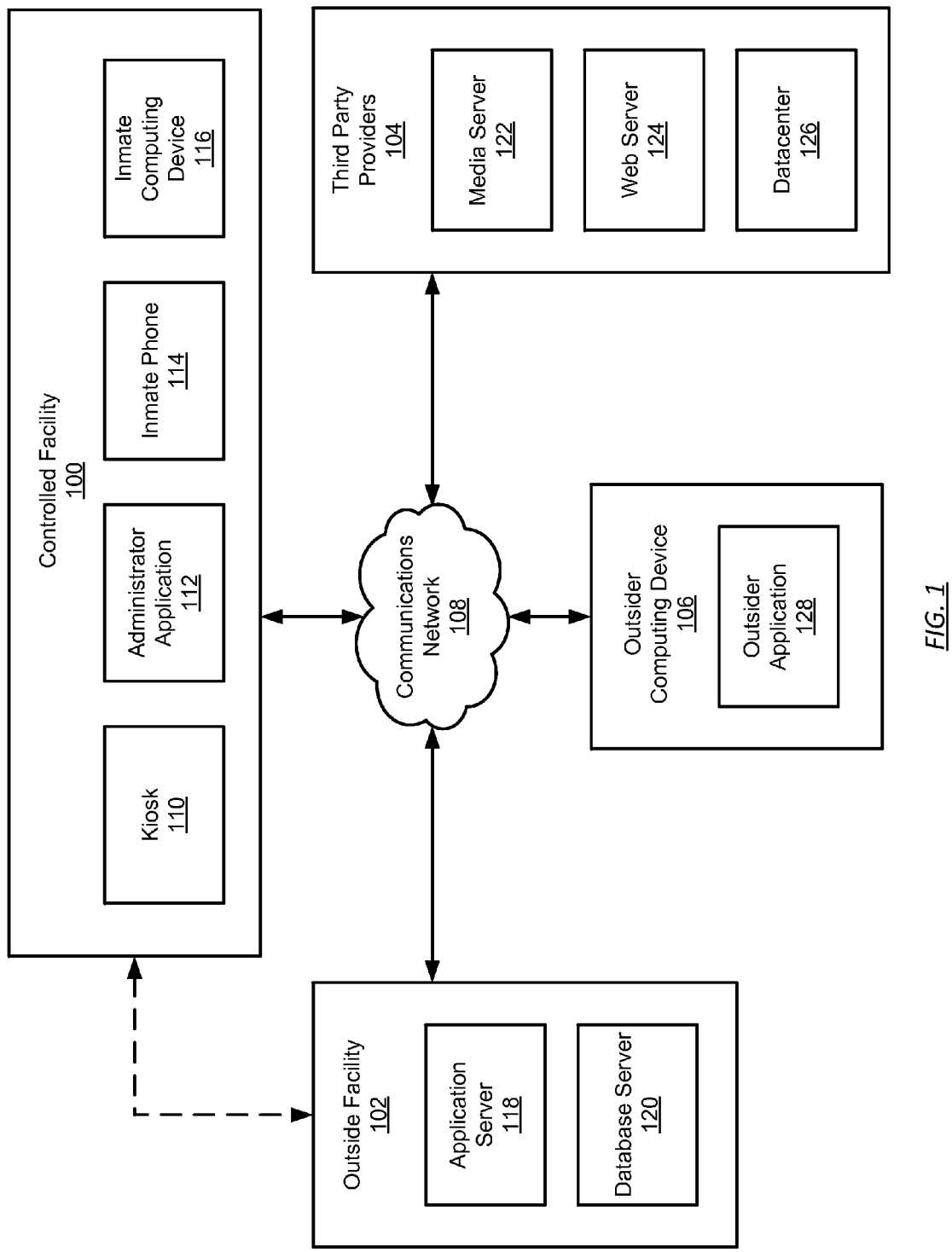
FIG. 1 shows a diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for financing a mobile device for an inmate. Specifically, after rules governing the use of mobile devices by inmates are received, a mobile device is received, and a mobile application is installed on the mobile device which conforms the mobile device to the rules. A payment is received for the mobile device, and the inmate is able to use the mobile device and/or mobile application.

Embodiments of the invention may include interactions with a secure social network. In one embodiment of the invention, a secure social network is a network application that facilitates and secures the exchange or transmission of information between two or more parties in which at least one of those parties is subject to special security or law enforcement restrictions or otherwise is subject to the controls of a controlled facility. Exchanged or transmitted information may be member generated, such as a photo or a video message, or it may be member-curated, such as a news headline, a famous quote, or a sports score.

FIG. 1 shows a diagram of a system in accordance with one or more embodiments of the invention. As shown in FIG. 1, the system includes a controlled facility (100), an outside facility (102), third party providers (104), and an outsider computing device (106) each communicatively coupled to a communications network (108). The controlled facility (100) may include, but is not limited to, a kiosk (110), an administrator application (112), an inmate phone (114), and an inmate computing device (116). The outside facility (102) may include an application server (118) and a database server (120). The third party providers (104) may include a media server (122), a web server (124), and a datacenter (126). The outsider computing device (106) may include an outsider application (128).

In one or more embodiments of the invention, a controlled facility (100) is an access-restricted location. Examples of controlled facilities (e.g., controlled facility (100)) include, but are not limited to, detention environments (e.g., jails, prisons, etc.), immigration detention centers, military centers, government secure sites, law enforcement holding structures, and psychiatric hospitals.

In one or more embodiments of the invention, an inmate is a person within a controlled facility (100) who is subject to one or more restrictions, primarily to his or her freedom or rights. Examples of inmates include, but are not limited to, prisoners, wards of the state, parolees, employees working in a secure office complex, temporary or long-term internees, patients, military personnel, uncharged suspects, and refugees. Inmate restrictions may be part of a courtimposed sentence on an inmate, while others may be specific to the controlled facility (100) exerting control over the inmate. Restrictions may include limitations on an inmate's physical movement (i.e., physical restrictions) and limitations on the inmate's ability to communicate (i.e., communication restrictions). Communication restrictions include inmate use restrictions, inmate target restrictions, and device use restrictions.

In one or more embodiments of the invention, inmate use restrictions are limitations on an inmate's general ability to communicate with visitors and/or outsiders. Inmate use restrictions may include, for example, periods of time in which an inmate is not allowed to communicate with outsiders or visitors (e.g., between 10 PM and 8 AM, during an imposed one-week punitive period, etc.) and limitations based on lack of funds (e.g., communication account balance to initiate a communication).

In one or more embodiments of the invention, inmate target restrictions are limitations on the target or source of a communication with the inmate. Inmate target restrictions may be specific outsiders or visitors with whom the inmate is not allowed to communicate (e.g., the victim of a crime perpetrated by the inmate, etc.). Inmate target restrictions may also include types of people with whom the inmate is not allowed contact (e.g., outsiders who are ex-cons, minors under the age of 18, etc.).

In one or more embodiments of the invention, device use restrictions are restrictions based on the condition or state of the communication device used by the inmate. Device use restrictions include, for example, limitations based on the location of the inmate's mobile device, limitations imposed based on a determination that the device has been tampered with, etc.

In one or more embodiments of the invention, an outsider is a person outside the controlled facility (100) who may be the source or target of a communication with an inmate. An outsider who enters the controlled facility (100) for the purpose of communicating with an inmate is referred to as a visitor.

In one or more embodiments of the invention, the kiosk (110) is a computing system with functionality to facilitate communication between an inmate and a visitor or outsider. Such communication facilitation may include creating a system identity data item or secure social networking account, adding or importing contact information for outsiders with whom the inmate wishes to communicate, uploading media (e.g., photos, videos, audio, and text) to, or viewing media from, a secure social network, sending or receiving messages or other media, acting as an endpoint for voice and video communication between an inmate and a visitor or outsider, scheduling a communication, and managing a commissary account.

In one or more embodiments of the invention, the administrator application (112) is a process or group of processes executing on a computing system with functionality to enable an administrator to create, remove, and/or enforce one or more restrictions on an inmate, device, visitor, and/or outsider. In one embodiment of the invention, an administrator is a person associated with the controlled facility charged with enforcing one or more restrictions. Examples of administrators include, but are not limited to, prison guards, orderlies, wardens, prison staff, jailers, information technology technicians, system administrators, and law enforcement agents. Using the administrator application, an administrator may retrieve or alter the identity data item and/or secure social network account of an inmate, visitor, or outsider. Further detail about the administrator application (112) is provided in FIG. 2.

In one or more embodiments of the invention, the inmate phone (114) is a device with functionality to send and receive audio communications between an inmate and an outsider or visitor. In one embodiment of the invention, the inmate phone (114) is a stationary (i.e., non-mobile) device. Further, a single inmate phone (114) may be used by more than one inmate. Further detail about the inmate phone (114) is provided in FIG. 2.

In one or more embodiments of the invention, the inmate computing device (116) is a computing device with functionality to enable an inmate to communicate with a visitor or outsider. Specifically, the inmate computing device (116) may be used to send or receive text messages and/or initiate or receive voice or video calls. In one embodiment of the invention, the inmate computing device (116) also enables an inmate to access a secure social network. Specifically, the inmate computing device (116) may be used to upload media to, or view media from, a secure social network account of the inmate or another secure social network member. In one embodiment of the invention, the inmate computing device (116) is a mobile computing device (e.g., a smartphone, a laptop, a tablet, etc.). Further detail about the inmate computing device (116) is provided in FIG. 2 and FIG. 4.

In one or more embodiments of the invention, the elements within the controlled facility (100) are communicatively coupled to the communications network (108). In one embodiment of the invention, the communications network (108) is a collection of computing systems and other hardware interconnected by communication channels. The communications network (108) may include networks that are exclusively or primarily used for a single type of communication, such as a telephone network (e.g., Plain Old Telephone System (POTS)), and/or networks used for a wide array of communication types, such as the Internet through Voice over IP (VoIP). Communication channels used by the communications network (108) may include, for example, telephone lines, networking cables, wireless signals, radio waves, etc. Fees charged and payments received by the provider(s) of the communications network (108) may involve multiple parties, including a service provider of the outside facility (102), the management of the controlled facility (100), and provider(s) of the communications network (108). In one or more embodiments of the invention, fees may be split between multiple parties based on the terms of underlying agreements or contracts between the parties. Further, rebates, reimbursements, and/or refunds may be afforded to and paid to the management of the controlled facility (100) based on the terms of underlying agreements or contracts between the parties. For example, the management of the controlled facility (100) may receive a rebate from the service provider of the services provided to inmates based on such factors as the volume of use, the dollar amount, and/or the frequency of use.

In one or more embodiments of the invention, the outside facility (102) is a group of computing systems located outside of the controlled facility (100). Specifically, the outside facility (102) may house system elements with functionality to facilitate communication between inmates and outsiders, access communication data between inmates and outsiders, and enforce one or more restrictions imposed on inmates and inmate communications. In one or more embodiments of the invention, the outside facility (102) is connected directly to the controlled facility (100) bypassing a generally accessible communications network (communications network (108)). One or more of the components within the outside facility (102) may alternatively be located within the controlled facility (100) or within the third party providers (104).

In one or more embodiments of the invention, the application server (118) is a computing system with functionality to authenticate an inmate, outsider, administrator, reviewer, or investigator for access to system functionality (e.g., initiating voice or video calls, sending text messages, etc.) or data stored on the database server (120) (e.g., inmate identities, communications between inmates and outsiders, etc.). The application server may authenticate inmates, outsiders, administrators, reviewers, and/or investigators using passwords, biometric data, digital access codes, and/or physical access devices. Further detail about the application server (118) is provided in FIG. 3.

In one or more embodiments of the invention, the database server (120) is a computing system with functionality to store identities used to authenticate inmates, outsiders, administrators, reviewers, and/or investigators. Such identities may include verified data used to compare to verification data provided by the inmate, outsider, administrator, reviewer, or investigator to authenticate the inmate, outsider, administrator, reviewer, or investigator.

In one or more embodiments of the invention, the database server (120) also stores communication data about communications between an inmate and an outsider or visitor. Such communication data may include, for example, a recording of a video call, the length of a voice call, the frequency of video calls, sent and received text messages, etc. The database server (120) may also store media submitted to a secure social network before, during, and/or after the media has been reviewed. Further detail about the database server (120) is provided in FIG. 3.

In one or more embodiments of the invention, the third party providers (104) are computing systems that provide network application and data storage services (i.e., cloud computing services). Third party providers (104) may include service providers used directly by inmates and outsiders, such as photo sharing services, general social networking sites, and digital music retailers. Third party providers (104) may include service providers employed by administrators and for use by inmates and outsiders, such as audio and video streaming applications, conferencing applications, and secure social network media storage. One or more of the components within the third party providers (104) may alternatively be located within the controlled facility (100) or the outside facility (102).

In one or more embodiments of the invention, the media server (122) is a computing system or group of computing system with functionality to provide network application services to facilitate communication between an inmate and an outsider, and to facilitate access to a secure social network. Such services include, but are not limited to, VoIP services, video conferencing services, and media streaming services.

In one or more embodiments of the invention, the web server (124) is a computing system or group of computing system with functionality to provide an interface to access and interact with webpages and other network application services. In one embodiment of the invention, the web server (124) is a type of media server (122).

In one or more embodiments of the invention, the datacenter (126) is a computing system or group of computing system with functionality to provide an interface to access and interact with data stored on one or more data servers (not shown). In one embodiment of the invention, the datacenter (126) is a type of media server (122).

In one or more embodiments of the invention, the outsider computing device (106) is a computing device with functionality to execute the outsider application (128). In one or more embodiments of the invention, the outsider computing device (106) is a mobile computing device (e.g., a smartphone, a laptop, a tablet, etc.). Further detail about the outsider computing device (106) is provided in FIG. 6.

In one or more embodiments of the invention, the outsider application (128) is a process or group of processes (in software, firmware, hardware, or combination thereof) with functionality to enable communication between an outsider and an inmate. Specifically, the outsider application (128) may be used to send or receive text messages and/or initiate or receive voice or video calls. In one embodiment of the invention, the outsider application (128) also enables an outsider to access a secure social network. Specifically, the outsider application (128) may be used to upload media to, or view media from, a secure social network account of the outsider, an inmate, other secure social network member.

Figure 2:
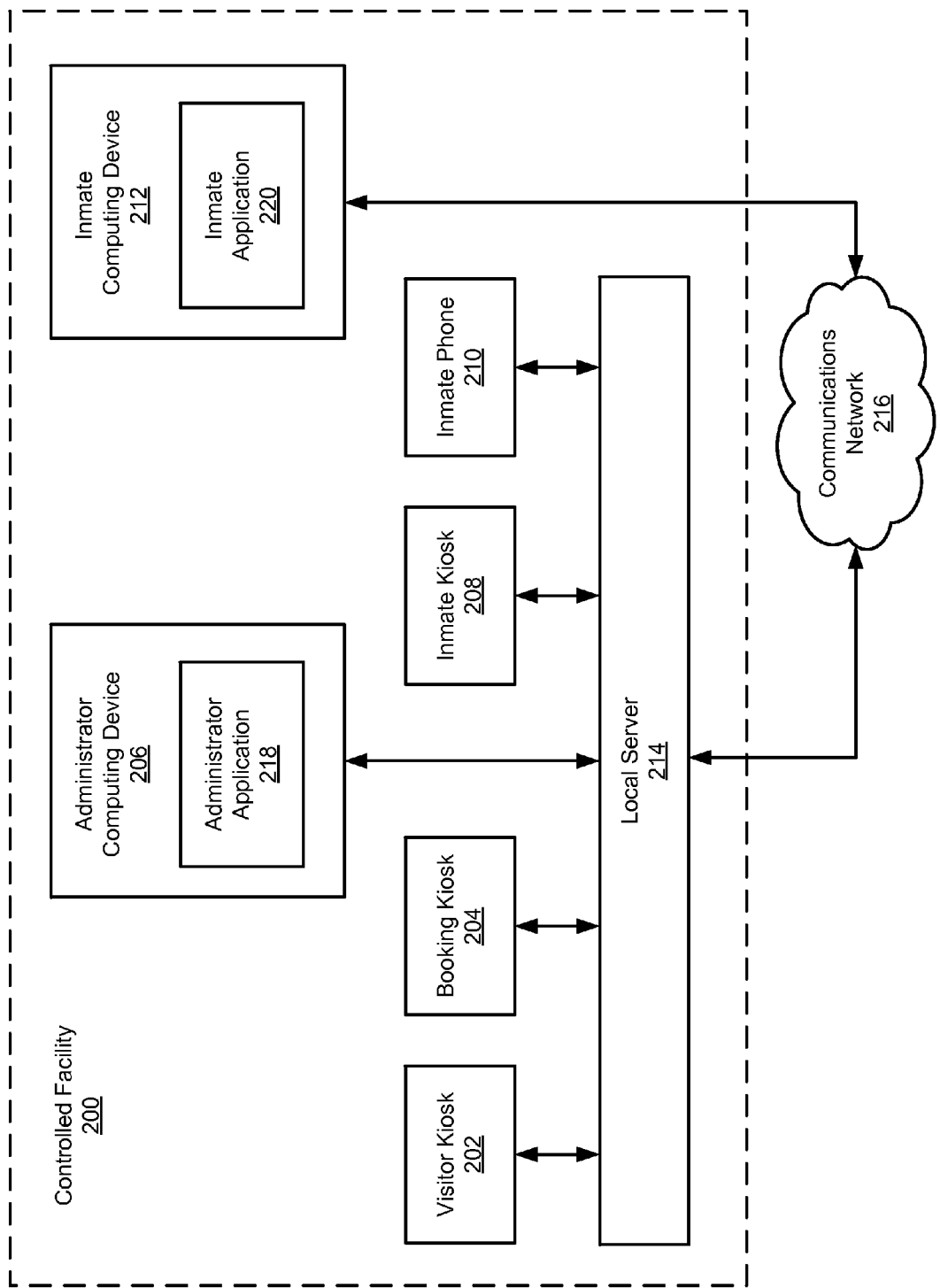
FIG. 2 shows a diagram of a controlled facility in accordance with one or more embodiments of the invention.

FIG. 2 shows a controlled facility in accordance with one or more embodiments of the invention. As shown in FIG. 2, the controlled facility (200) may include a visitor kiosk (202), a booking kiosk (204), an administrator computing device (206), an inmate kiosk (208), an inmate phone (210), an inmate computing device (212), and a local server (214). The inmate computing device (212) and the local server (214) are communicatively coupled to the communications network (216). The administrator computing device (206) includes an administrator application (218). The inmate computing device (212) includes an inmate application (220).

In one or more embodiments of the invention, the visitor kiosk (202) is a computing system with functionality to facilitate communication between an inmate and a visitor. Specifically, the visitor kiosk (202) may be a combination of computing hardware and software used by a visitor to make and receive voice and video calls to/from an inmate residing in the same controlled facility (200) or another controlled facility (not shown). The visitor kiosk (202) may also be used to schedule a voice or video call with an inmate for a future date. Further, the visitor kiosk (202) may also include the functionality to exchange media (e.g., photos, videos, and audio) with an inmate residing in the controlled facility (200). The visitor kiosk (202) may include functionality to generate such media, such as a camera, microphone, keyboard, and software to record or otherwise create media to send to an inmate. Such media may be subject to review before being delivered.

In one or more embodiments of the invention, a visitor wanting to use a visitor kiosk (202) may be required to participate in an authentication process to verify the identity of the visitor. The authentication process may include creating an identity data item and verified data for storage and later comparison. The verified data used for authentication may be a username and password combination and/or biometric information about the visitor.

In one or more embodiments of the invention, the visitor kiosk (202) includes functionality to access a secure social network. Specifically, the visitor kiosk (202) may be used by a visitor to create and manage a secure social network account. The visitor kiosk (202) may also be used by a visitor to upload digital media to the visitor's secure social network account or the account of another secure social network member. The visitor kiosk (202) may further be used to view digital media uploaded to the visitor's social network account or the account of another secure social network member.

In one or more embodiments of the invention, the visitor kiosk (202) includes functionality to manage a commissary account and/or communication account for one or more inmates. Specifically, a visitor may use a visitor kiosk (202) to add money to the commissary account and/or communication account of an inmate in the controlled facility (200), view a transaction history of the commissary account and/or or communication account, transfer funds between commissary accounts and/or or communication accounts, and/or remove funds from a commissary account and/or or communication account.

In one or more embodiments of the invention, the booking kiosk (204) is a computing system with functionality to aid administrators in admitting an inmate into a controlled facility (e.g., controlled facility (200)). Specifically, the booking kiosk (204) may include functionality to create or update an inmate identity data item. Specifically, the booking kiosk (204) may be used to obtain verified data (e.g., passwords, biometric data, etc.) and save the verification data in one or more identity data items for the inmate. The verified data may then be used to authenticate the inmate for access to the communications network (216). In one embodiment of the invention, the booking kiosk may also be used to associate one or more restrictions with the inmate via the inmate's identity data item.

In one or more embodiments of the invention, the booking kiosk (204) includes functionality to input contact information for visitors, outsiders, administrators, or other inmates with whom the inmate wants to communicate. Such contact information may then be associated with the inmate's identity data item, and may be used to initiate a voice or video call, or otherwise transmit media to visitors, outsiders, or other inmates. Further, in one embodiment of the invention, the contact information may be retrieved from an inmate's mobile computing device (e.g., cell phone, smart phone, etc.) or a local or remote data storage device (e.g., a flash drive, a webmail account, etc.). The contact information may be retrieved using a wired or wireless connection between the booking kiosk and the inmate's mobile computing device and/or the data storage device. The contact information may be subject to review before the inmate is permitted to contact the visitor, outsider, administrator, or other inmate.

In one or more embodiments of the invention, the booking kiosk (204) includes functionality to prepare a mobile computing device for use by the inmate within the controlled facility (200). Specifically, a controlled facility (200) may allow inmates the use of computing devices while residing in or subject to the controlled facility (200). However, use of such inmate computing devices may require that the computing device is instrumented with software restricting the use of the inmate computing device. The booking kiosk (204) may be used to instrument the inmate computing device as required.

In one or more embodiments of the invention, the administrator computing device (206) is a computing system or group of computing systems with functionality to execute the administrator application (218). In one embodiment of the invention, the administrator application (218) is a process or group of process with functionality to provide access to communications between inmates at the controlled facility (200) and visitors, outsiders, administrators, and other inmates. The administrator application (218) may also be used to monitor current voice or video calls between an inmate and a visitor, outsider, administrator, or other inmate.

In one embodiment of the invention, the administrator application (218) is used to manage an identity data item associated with an inmate. Such management may include altering the restrictions (device use restrictions, inmate use restrictions, and inmate target restrictions) applicable to the inmate. In one embodiment of the invention, the administrator application (218) is used to access the secure social network account of an inmate, visitor, or outsider. In one embodiment of the invention, the administrator application (218) may provide heightened access (i.e., a level of access greater than that of the inmate, visitor, or outsider) to data stored in the secure social networking account.

In one or more embodiments of the invention, the inmate kiosk (208) is a computing system with functionality to facilitate communication between an inmate and a visitor or outsider. Specifically, the inmate kiosk (208) may be a combination of computing hardware and software used by an inmate to make and receive voice and video calls to/from a visitor, outsider, or another inmate residing in another controlled facility (not shown). The inmate kiosk (208) may also be used to schedule a voice or video call with a visitor at a future date. Initiating or scheduling a voice or video call may include determining whether the currently attempted call or the scheduled call are adverse to one or more restrictions (e.g., inmate use restrictions, device use restrictions, and/or inmate target restrictions). Further, the inmate kiosk (208) may also include the functionality to exchange media (e.g., photos, videos, and audio) with a visitor or outsider. The inmate kiosk (208) may include functionality to generate such media, such as a camera, microphone, keyboard, and software to record or otherwise create media to send to a visitor or outsider. Such media may be subject to review before being delivered.

In one or more embodiments of the invention, an inmate wanting to use an inmate kiosk (208) may be required to participate in an authentication process to verify the identity of the inmate. The authentication process may include providing verification data for comparison to verified data previously obtained from the inmate and stored in the inmate identity data item. The verified data may be a username and password combination and/or biometric information about the inmate.

In one or more embodiments of the invention, the inmate kiosk (208) includes functionality to access a secure social network. Specifically, the inmate kiosk (208) may be used by an inmate to manage a secure social network account. The inmate kiosk (208) may also be used by an inmate to upload digital media to the inmate's secure social network account or the account of another secure social network member. The inmate kiosk (208) may further be used to view digital media uploaded to the inmate's social network account or the account of another secure social network member. Uploaded media may be subject to review before posting.

In one or more embodiments of the invention, the inmate kiosk (208) includes functionality to manage a commissary account for the inmate. Specifically, an inmate may use an inmate kiosk (208) to view a transaction history of the commissary account and/or to apply commissary funds for goods and services consumed or enjoyed by the inmate.

In one or more embodiments of the invention, the inmate phone (210) is a device with functionality to send and receive audio communications between an inmate and an outsider or visitor. The inmate phone (210) may be implemented as handset connected to a telephone line. In one embodiment of the invention, all or part of the voice call may be conducted over a VoIP connection. In one embodiment of the invention, a single inmate phone (210) is utilized by multiple inmates.

In one embodiment of the invention, initiating or receiving a voice call using the inmate phone (210) requires a form of authentication (e.g., providing a password, personal identification number, or voice verification). In one embodiment of the invention, voice calls made using the inmate phone (210) are monitored by one or more administrators using the administrator computing device (206), and are recorded and stored in a data storage system within the controlled facility (200), within the outside facility (not shown), or within a third party provider (not shown). The inmate phone (210) may also be subject to device use restrictions limiting the ability to use the inmate phone (210) at certain times (e.g., between 9 PM and 8 AM) or under certain conditions (e.g., emergency lockdown).

In one embodiment of the invention, the identity of the visitor or outsider targeted by the inmate or attempting to contact the inmate using the inmate phone (210) is verified against inmate target restrictions imposed on the inmate. Such restrictions may be associated with the inmate's identity data item and may be stored locally within the controlled facility (200), within the outside facility (not shown), or within a third party provider (not shown). The visitor or outsider identity may be verified by the local server (214) or by another server within the outside facility (not shown), or within a third party provider (not shown).

In one or more embodiments of the invention, the inmate computing device (212) is a computing system configured to execute the inmate application (202). In one embodiment of the invention, each inmate computing device (212) is utilized exclusively by a single inmate. In one embodiment of the invention, access to the inmate application requires a form of initial authentication. This initial authentication may use verification data stored locally on the inmate computing device (212) (e.g., a code or combination used to unlock the phone, locally stored biometric data, etc.).

In one or more embodiments of the invention, accessing a communications network (e.g., communications network (216)) using the inmate application (220) may require further network-based authentication. This further authentication may use verification data stored external to the inmate computing device (212) but locally within the controlled facility (200), or remotely within the outside facility (not shown) or within a third party provider (not shown).

In one or more embodiments of the invention, an authenticated inmate may use the inmate application to initiate or receive voice or video calls, initiate or receive text or media messages, schedule a voice or video call, manage a commissary account, manage a communication account, and/or post media to a secure social network. In one embodiment of the invention, voice and video calls made using the inmate computing device (212) are monitored by one or more administrators using the administrator computing device (206), and are recorded and stored in a data storage system within the controlled facility (200), within the outside facility (not shown), or within a third party provider (not shown).

In one embodiment of the invention, the identity of the visitor or outsider targeted by the inmate or attempting to contact the inmate using the inmate computing device (212) is verified against inmate target restrictions imposed on the inmate. Such restrictions may be associated with the inmate's identity data item and may be stored locally within the controlled facility (200), within the outside facility (not shown), or within a third party provider (not shown). The visitor or outsider identity may be verified by the local server (214) or by another server within the outside facility (not shown), or within a third party provider (not shown).

In one or more embodiments of the invention, the inmate computing system (212) and/or the inmate application (220) may limit access to the communications network (216) based on one or more restrictions (inmate use restrictions, inmate target restrictions, and device use restrictions). Further, the inmate computing system (212) and/or the inmate application (220) may gather data from input devices of the inmate computing system (212) to determine whether one or more restrictions apply Such input devices may include, for example, a system clock, a global positioning system antenna, a wide area network antenna, etc.

In one or more embodiments of the invention, the local server (214) is a computer system or group of computers systems located within the controlled facility (200) that facility communication between inmates and visitors, outsiders, and/or other inmates. Specifically, the local server (214) may implement the software necessary to host voice and video calls between and among the visitor kiosk (202), the inmate kiosk (208), the inmate phone (210), and an outsider computing system (not shown). The local server (214) may also include functionality to enforce communication restrictions associated with the inmates using the inmate kiosk (208) or inmate phone (210). Alternatively, the local server (214) may merely provide access to other systems capable of hosting the communication software and data storage (e.g., located within an offsite facility or a third party provider). Further, in one embodiment of the invention, the local server (214) includes functionality to regulate inmate access to a secure social network.

Figure 3:
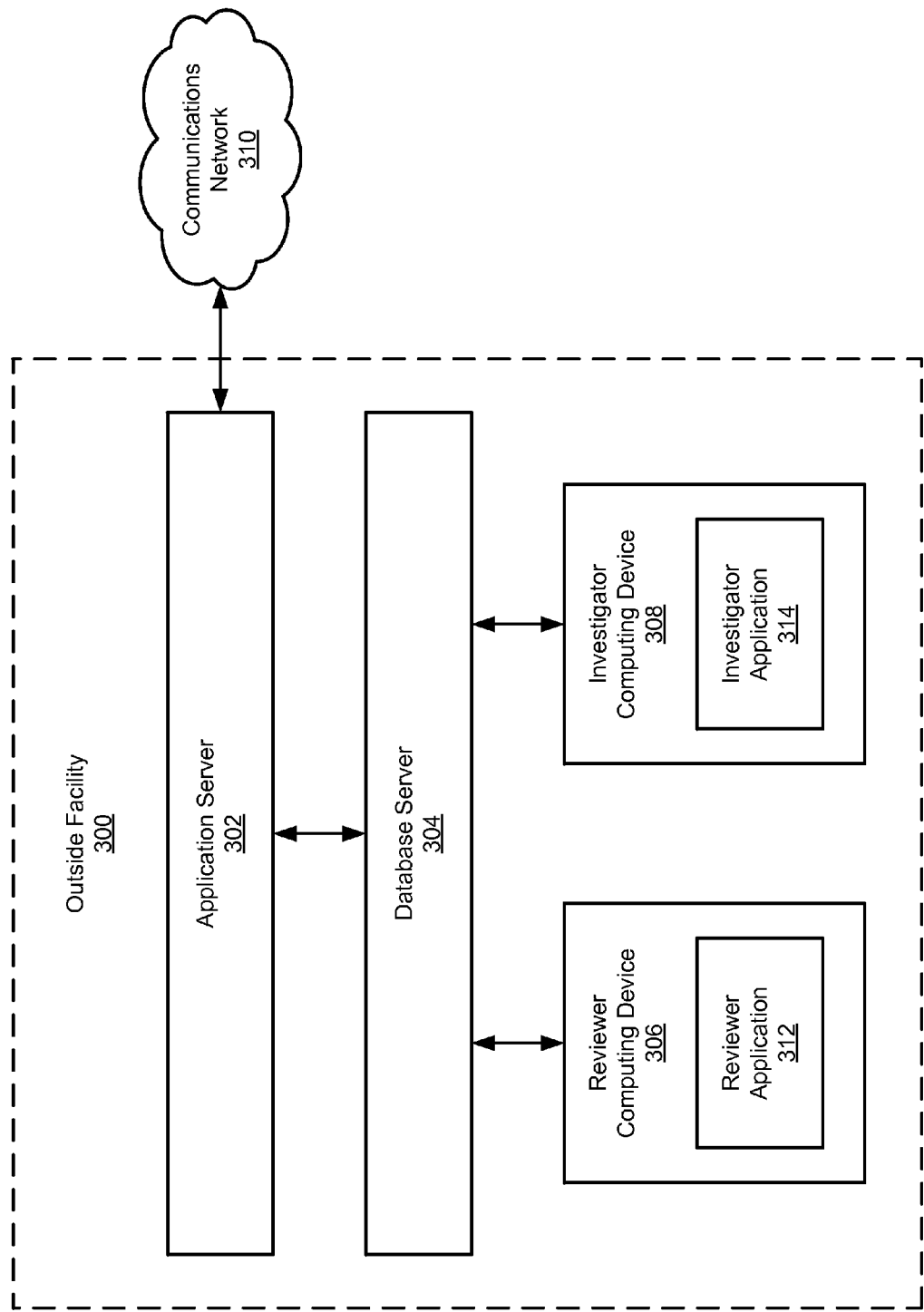
FIG. 3 shows a diagram of an outside facility in accordance with one or more embodiments of the invention.

FIG. 3 shows an outside facility in accordance with one or more embodiments of the invention. As shown in FIG. 3, the outside facility (300) includes an application server (302), a database server (304), a reviewer computing system (306), and an investigator computing system (308). The application server (302) is communicatively coupled to the communications network (310). The reviewer computing device (306) includes a reviewer application (312), and the investigator computing device (308) includes an investigator application (314).

In one or more embodiments of the invention, the application server (302) is a computing system or group of computing systems configured to authenticate inmates, visitors, outsiders, administrators, reviewers, and/or investigators. Specifically, the application server (302) includes functionality to receive a request to authenticate an inmate, visitor, outsider, administrator, reviewer, and/or an investigator, retrieve verified data associated with the request, and compare the verified data to verification data submitted in the authentication request. In one or more embodiments of the invention, the application server provides access to identity data items and other data stored in the database server (304).

In one or more embodiments of the invention, the database server (304) is a computing system or group of computing system configured to store data about inmates, visitors, outsiders, administrators, reviewers, and/or investigators as well as communication data describing communications between and among inmates, visitors, outsiders, administrators, reviewers, and/or investigators. Data stored in the database server may include, but is not limited to, identity data items, verified data, approved communication media, communication media pending review In one or more embodiments of the invention, the reviewer computing device (306) is a computing system configured to execute the reviewer application (312). In one embodiment of the invention, a reviewer is a person charged with viewing a media item submitted by an inmate, visitor, or outsider, and determining one or more attributes of the media item. Based on the determined attributes of the media item, the reviewer may then approve the media item for transmission to its target inmate, visitor, or outsider. Alternatively, the reviewer may reject, conditionally approve, or redact the media item, thus preventing or altering the transmission to its target inmate, visitor, administrator, or outsider. In one embodiment of the invention, the reviewer application (312) include functionality to view media items, associate one or more attributes to the media item, and/or mark the media items as approved or rejected.

In one or more embodiments of the invention, the investigator computing device (308) is a computing system configured to execute the investigator application (314). In one embodiment of the invention, an investigator is a person gathering information about an inmate, visitor, or outsider generally for the purposes of law enforcement. The investigator application (314) includes functionality to provide access to data stored on the database server (304) for investigative purposes.

Figure 4:
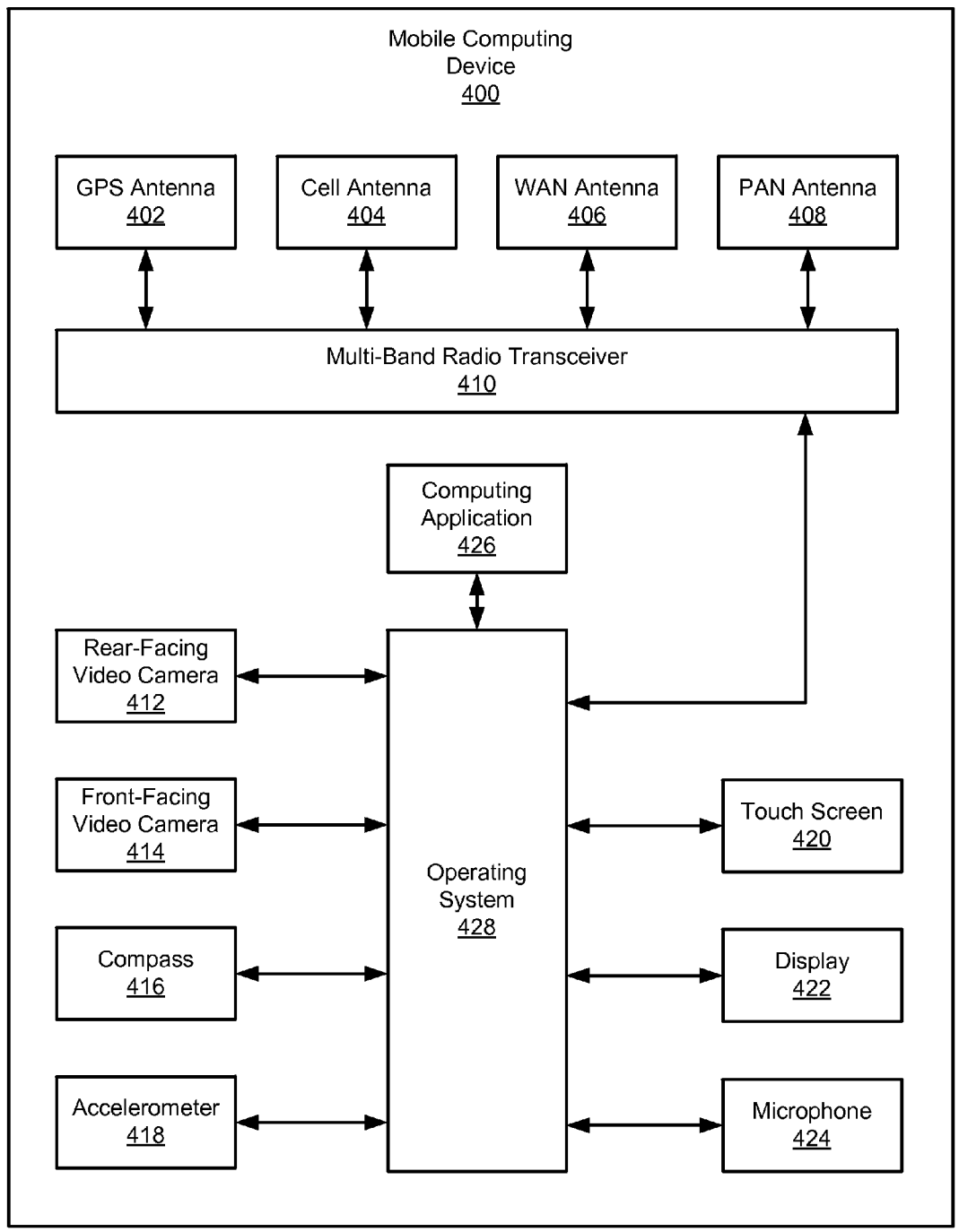
FIG. 4 shows a diagram of a mobile computing device in accordance with one or more embodiments of the invention.

FIG. 4 shows the hardware and software elements of a mobile computing device in accordance with one or more embodiments of the invention. Specifically, the mobile computing device (400) is a portable device that provides a user interface. Examples of mobile devices may include, but are not limited to, cellular phones, personal digital assistants, personal communicators, pagers, smart phones, or any other computing device. The hardware and software elements shown in FIG. 4 may be in addition to the elements described in FIG. 8.

As shown in FIG. 4, the mobile computing device (400) includes a global positioning system (GPS) antenna (402), a cell antenna (404), a wide area network (WAN) antenna (406), and a personal area network (PAN) antenna (408), each connected to a multi-band radio transceiver (410). GPS antenna (402) includes functionality to obtain a location coordinate of the mobile computing device (400). Mobile computing device (400) may be configured to use the GPS antenna (402) to provide latitude and longitude location coordinates. In one or more embodiments of the invention, the network connection (i.e., via antenna (402), cell antenna (404), WAN antenna (406), PAN antenna (408), and/or multi-band radio transceiver (410)) may be facilitated by a wireless infrastructure (not shown), including one or more transceivers cooperating to facilitate wireless communications to wireless devices. The wireless infrastructure may include one or more routers, switches, microwave links, base stations, optical fibers, or other similar networking hardware or software components. For example, the wireless infrastructure may be a paging network, a cellular network, etc.

The mobile computing device (400) may also include a rear-facing video camera (412), a front-facing video camera (414), a compass (416), an accelerometer (418), a touch screen (420), a display (422), and a microphone (424), all of which may include any functionality or features now known or later developed. The mobile computing device (400) may also include a computing application (426) executing on an operating system (428).

Figure 5:
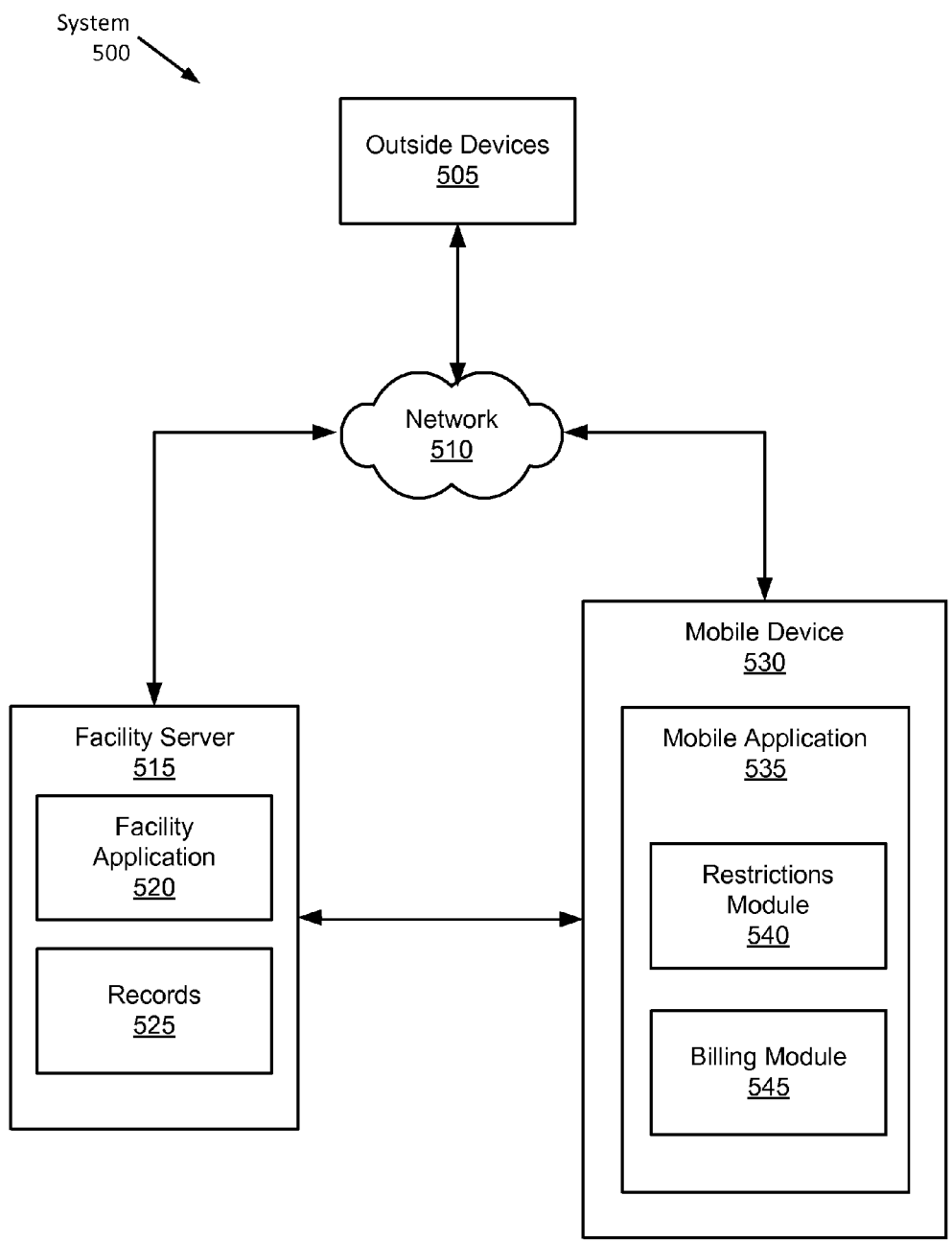
FIG. 5 shows a diagram of a system in accordance with one or more embodiments of the invention.

FIG. 5 shows a diagram of a system for financing a mobile for an inmate. Specifically, the system (500) includes outside devices (505), a network (510), a facility server (515), a facility application (520), records (525), a mobile device (530), a mobile application (535), a restrictions module (540), and a billing module (545) in accordance with one or more embodiments of the invention. In one or more embodiments of the invention, the outside devices (505) are any devices outside of the prison or controlled facility, with which an inmate desires to communicate. The outside devices (505) may be any suitable device for communication such as outsider computing device (106) in FIG. 1, any smart phone, computer, and/or any other suitable device. It will be apparent to one of ordinary skill in the art that the outside devices (505) may be many different devices and, as such, the invention should not be limited to the above examples.

In one or more embodiments of the invention, a network (510) is any network, wired or wireless, that may be used for communication. For example, the network (510) may be a Wide Area Network (WAN) such as the Internet, a Local Area Network (LAN), a cell phone network, and/or any other suitable network. It will be apparent to one of ordinary skill in the art that the network (510) may be used for communication amongst the outside devices (505), the facility server (515), and the mobile device (530) and, as such, should not be limited to the above examples.

In one or more embodiments of the invention, the facility server (515) is any computing device (i.e., a rack, server, desktop computer, laptop computer, etc.) owned, controlled, or used by the prison or controlled facility which houses the inmate(s) using the mobile devices (e.g., the mobile device (530)) of the present invention. For example, the facility server (515) may have the components and/or functionality described with regards to the application server (302) and/or the database server (304) in FIG. 3. In one or more embodiments of the invention, the facility server (515) is owned by a third party, such as a prison telephone system provider. Specifically, the facility server (515) may facilitate the use of mobile devices (e.g., the mobile device (530)) by inmates of the prison or controlled facility. For example, all messages or data sent by the mobile device (530) may be routed through and/or stored on the facility server (515). The facility server (515) executes the facility application (520) and stores records (525). Further, in one or more embodiments of the invention, the facility server (515) receives, manages, and facilitates financial transactions associated with the mobile device (530), and may be have any functionality described with respect to the billing module (545), below.

In one or more embodiments of the invention, the facility application (520) enables the use of mobile devices (e.g., the mobile device (530)) by the inmates of the prison or controlled facility. In one or more embodiments of the invention, the facility application (520) may assist in the installation of the mobile application (535) on the mobile device (530), for example, by sending the necessary data to the mobile device (530). Additionally, the facility application (520) may allow administrators of the prison or controlled facility to establish or alter restrictions on the use of the mobile device (530) by inmates, which may subsequently be distributed to the mobile device (530) in the form of an update. The facility application (520) may also provide software updates to the mobile device (530) for any other reason. In one or more embodiments of the invention, the facility application (520) is able to remotely enable/disable the mobile device (530), using any method now known or later developed. The facility application (520) may receive and/or manage payments from inmates for the use of the mobile device (530). The payments that the facility application (520) may receive or manage are discussed in more detail below, with the billing module (545). In one or more embodiments of the invention, the facility application (520)

tracks and records every action taken by the inmate(s) using the mobile device (530), and stores the data as records (525). It will be apparent to one of ordinary skill in the art that the facility application (520) is able to perform any actions necessary for the deployment and administration of an inmate mobile device system and, as such, the invention should not be limited to the above examples.

In one or more embodiments of the invention, records (525) are records of the usage of the mobile device (530) by the inmates of the prison or controlled facility. Records (525) may store any and all actions take using the mobile device (530). For example, records (525) may store text messages received and sent, record all video calls, log every picture taken, track every game played, and/or any other action taken on the mobile device (530).

In one or more embodiments of the invention, the mobile device (530) is a smart phone, cell phone, laptop, or other mobile computing device. For example, the mobile device (530) may be similar to the mobile computing device (400) of FIG. 4, and/or the inmate computing device (116) of FIG. 1. The mobile device (530) may have many different components and functionality, some of which are not appropriate for a prison or controlled facility. Thus, the mobile application (535) is installed on and executes on the mobile device (530) to limit the functionality of the mobile device (530). The mobile device (530) may be received from a variety of different sources. For example, the inmate may already own the mobile device (530) when they enter the prison or controlled facility. Alternatively, if the inmate has an illegal mobile device, the inmate may exchange and/or turn in the mobile device (530) via, for example, an amnesty program. As another option, the inmate may purchase the mobile device (530) from the prison or controlled facility, a third party supplier, phone company, or other suitable entity. Further still, the inmate may be able to rent the mobile device (530) from the prison or controlled facility, a prison telephone system provider, or other third party. For example, the inmate may be able to rent the mobile device (530) for any amount of time including but not limited to: hours, days, weeks, months, or years. Further still, a rent to own program, where once the inmate makes a set amount of payments (e.g., 75, 100, etc.) the inmate owns the mobile device (530), may be provided. The funds for making the payment(s) may come from any source, and are discussed in detail with regards to the billing module (545), below.

In one or more embodiments of the invention, the mobile application (535) limits the functionality of the mobile device (530), thereby making the mobile device (530) appropriate for a prison or controlled facility. The mobile application (535) may replace, augment, or limit the original operating system of the mobile device (530). Alternatively, the mobile application (535) may be a program that the inmate uses to access services via the mobile device (530). In one or more embodiments of the invention, the mobile application (535) may be periodically updated (e.g., by the facility server (515)) to ensure that the restrictions and software is up to date. The mobile application (535) includes a restrictions module (540) and a billing module (545). It will be apparent to one of ordinary skill in the art that the mobile application (535) contains any functionality necessary to turn the mobile device (530) into a mobile device approved for use by an inmate and, as such, the invention should not be limited to the above examples.

In one or more embodiments of the invention, the restrictions module (540) includes all of the limitations and/or restrictions for the mobile device (530). The restrictions module (540) may receive the limitations and/or restrictions from any suitable source including, but not limited to: administration of the prison or controlled facility, the facility server (515), etc. The restrictions module (540) may limit any component or functionality of the mobile device (530). For example, the restrictions may include but are not limited to: limiting the hours at which the mobile device may be used (i.e., 6 am to 6 pm, etc), restricting what websites the inmate may access, limitations on the base functionality of the device such as games, phone calls, video, text messaging, camera/pictures, Global Positioning System (GPS) tracking, restrictions on locations where the mobile device may be used, rules for stolen devices (i.e., disabled immediately, actively tracked, etc), rules for transitioning the mobile device to the inmate when the inmate is released, rules governing the archiving and review of all actions taken on the mobile device, rules limiting who the inmate may contact, and/or any other suitable restrictions for a mobile device. It will be apparent to one of ordinary skill in the art that the restrictions may take many different forms and, as such, the restrictions module (540) should not be limited to the above examples.

In one or more embodiments of the invention, the billing module (545) is responsible for payments made for or using the mobile device (530). Optionally, the functionality associated with the billing module (545) may be located on another component, such as the facility server (515) or other suitable device. The billing module (545) may enable an inmate to make payments from the prisoner's commissary account, or any other account allowed by the prison or controlled facility including, but not limited to: checking accounts, savings account, credit cards, gift cards, online payment accounts, and/or any other account. In one or more embodiments of the invention, family or friends of the inmate may place funds into a special account strictly for payment of fees associated with the mobile device (530), which the inmate may then access via the billing module (545) for payment of any fees associated with the mobile device (530) or the usage of mobile device (530).

Figure 6:
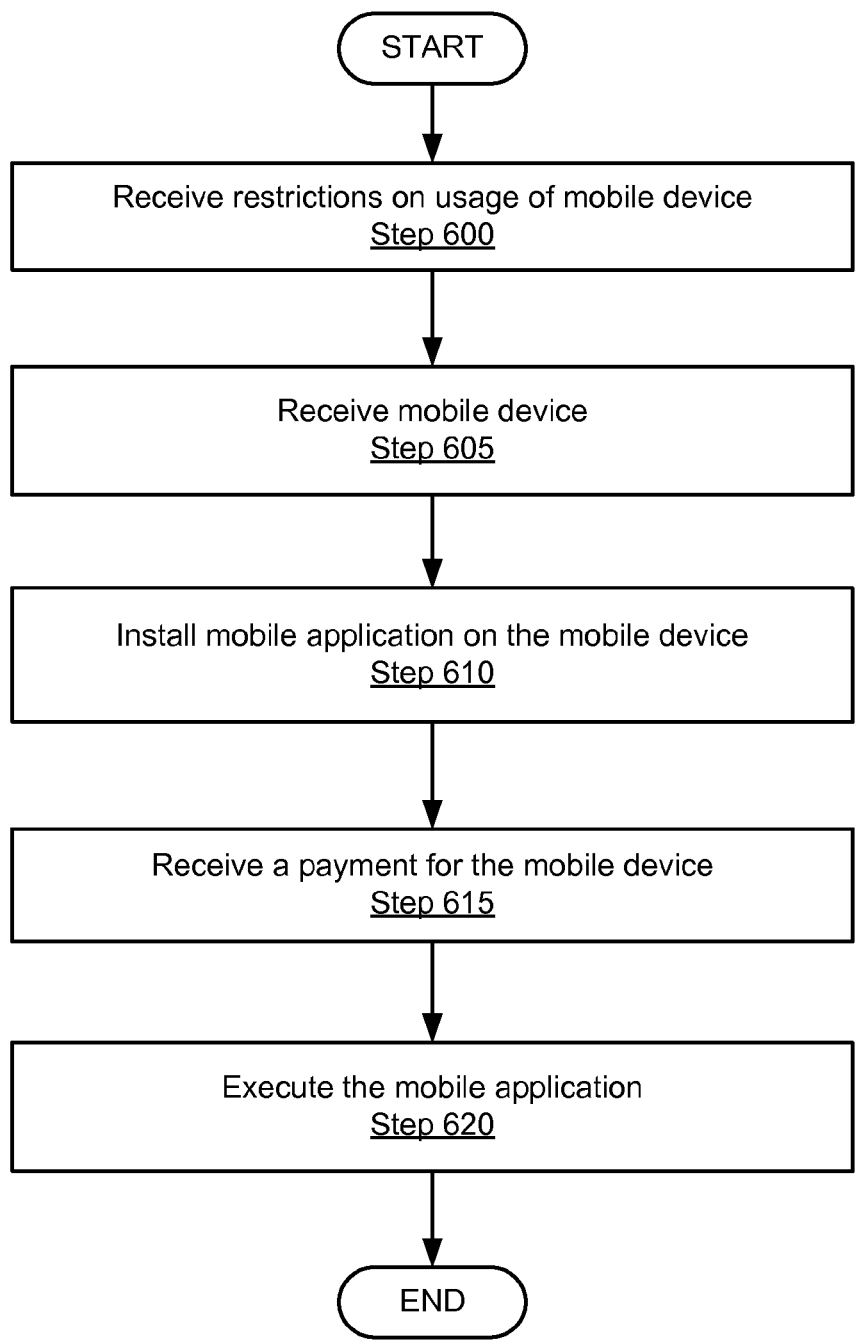
FIG. 6 shows a flowchart of a method in accordance with one or more embodiments of the invention.

FIG. 6 shows a flowchart of a method for financing a mobile device for an inmate. While the various steps in this flowchart are presented and described sequentially, one of ordinary skill in the art will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIG. 6 should not be construed as limiting the scope of the invention.

In Step 600, restrictions are received on the usage of the mobile device. The restrictions may be received, for example, from the institution whose controls the inmate is subject to, such as a prison, jail, military base, security controlled environment, and or any other controlled area. Alternatively, the restrictions may be received from a third party, such as the organization providing the mobile phones, the government, or any other suitable organization or entity. In one or more embodiments of the invention, the restrictions define how the inmate may interact with the mobile device. As described previously, the restrictions may be an inmate use restriction, inmate target restriction, device restriction, and/or any other restriction. For example, the restrictions may include but are not limited to:

limiting the hours at which the mobile device may be used (i.e., 9 am to 9 pm, etc), restricting which Uniform Resource Locators (URLs) (i.e., what websites) the inmate may access, limitations on the base functionality of the device such as games, phone calls, video, text messaging, camera/pictures, Global Positioning System (GPS) tracking, restrictions on locations where the mobile device may be used, rules for stolen devices (i.e., disabled immediately, actively tracked, etc), rules for transitioning the mobile device to the inmate when the inmate is released, rules governing the archiving and review of all actions taken on the mobile device, rules limiting who the inmate may contact, and/or any other suitable restrictions for a mobile device. It will be apparent to one of ordinary skill in the art that the restrictions may take many different forms and, as such, the invention should not be limited to the above examples.

In Step 605, the mobile device is received. The mobile device may be received in a variety of ways. For example, when an inmate first arrives at the detention center, he or she may bring a mobile device with him or her. Alternatively, an illegal mobile device may be confiscated from an inmate, or turned in during an amnesty program, for example. Further still, the mobile device may be a new (or used) device acquired, or rented, from a telephone company and/or other third party. It will be apparent to one of ordinary skill in the art that the mobile device may come from any source and, as such, the invention should not be limited to the above examples.

In Step 610, a mobile application is installed on the mobile device. The mobile application may, for example, replace the operating system of the mobile device. Alternatively, the mobile application may merely augment or alter the operating system, such as by limiting the functionality of the operating system. Further still, mobile application may merely be an application that executes on top of the operating system of a mobile device. The mobile application may be installed on the mobile device using any method now known or later developed. It will be apparent to one of ordinary skill in the art that the mobile application converts an open mobile device into a tightly controlled and monitored mobile device that is appropriate for an inmate at a prison or controlled facility and, as such, the invention should not be limited to the above examples.

In Step 615, a payment is received for the mobile device. The payment may be received in a variety of ways including, but not limited to: from a family member or friend paying using any method now known or later developed, from a commissary account of the inmate (either via a payment module on the mobile device or via a computer associated with the commissary, or any other suitable method), etc. The payment may be for usage of the device, and the amount of the payment may be based on a variety of financial models. For example, there may be a free (to the inmate) model, a subscription model, and an ala carte model. The free model may have friends and family pay for communications with the inmate, while the inmate uses the mobile device for free. The subscription model may have a weekly or monthly charge, and usage limits such as a maximum number of messages or data per day or billing period. Finally, the ala carte model may have payments based on the specific activity performed on the mobile device—some activities may have a fee associated with them (e.g., send a text message for 10 cents, etc.), while others may be free (e.g., reading the news, etc.).

Additionally, in one or more embodiments of the invention, a rent to own program may be available for the inmate. That is, after the inmate makes a set number of rental payments (e.g., 50 payments, 75 payments, etc.) the inmate will own the mobile device, and will be able to sell it or take it with him or her when they leave the prison or controlled facility. It will be apparent to one of ordinary skill in the art that there are many ways to structure payments for the mobile device and, as such, the invention should not be limited to the above examples.

In Step 620, the mobile application is executed. The inmate may be required to execute the application to access the mobile device, thereby ensuring that unauthorized use of the mobile device is not possible. While the mobile application is executing, the inmate may perform any allowed action on the mobile device (provided payment has been made, when applicable), and all actions taken may be tracked and stored for later review by administrators of the prison or controlled facility.

The following section describes various examples of the invention. The examples are included to aid in the understanding of the invention and are not intended to limit the scope of the invention.

Figure 7:
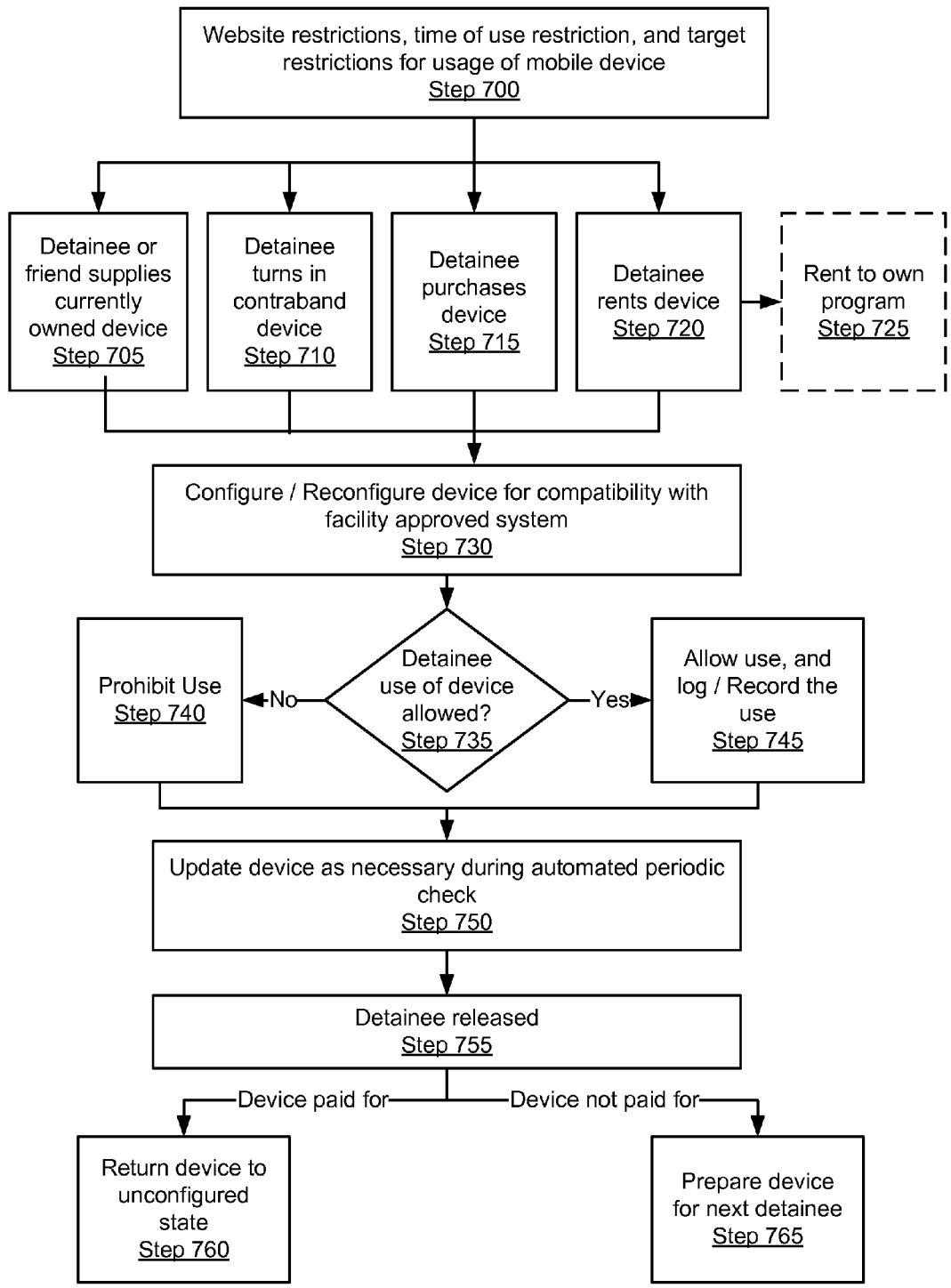
FIG. 7 shows an example in accordance with one or more embodiments of the invention.

FIG. 7 shows an example in accordance with one or more embodiments of the invention. The steps shown in FIG. 7 may be performed in any order and should not be limited to the arrangement shown in FIG. 7.

In Step 700, website restrictions, time of use restrictions, and target restrictions for usage of the mobile device are received from the prison. Next a mobile device is received from one of a variety of sources, such from the detainee or a friend supplying a currently owned device (Step 705), a detainee turning in a contraband device (Step 710), a detainee purchasing a device (Step 715), or a detainee renting a device (Step 720). Optionally, when a detainee rents a device (Step 720), the detainee may establish a rent to own program (Step 725) that outlines how many payments the detainee must make before full ownership of the device is transferred to the detainee.

Regardless of how or from where the mobile device is acquired, the device is configured/reconfigured for compatibility with facility approved system (Step 730) by installing a mobile application. Subsequently, when the detainee uses the mobile device, it is determined if the use is allowed (Step 735). When the use of the device is not allowed, such as when the use violates the rules or there are insufficient funds to pay for the usage, the use is prohibited (Step 740). When the use is allowed and there are sufficient funds, the use is allowed and logged/recorded for later review (Step 745) by administrators, investigators, and other suitable parties.

At any time, the mobile device may be updated during an automated periodic check (Step 750), to ensure that the device and the mobile application maintain the highest standards of security and the most up to date restrictions. Finally, at some point, the detainee is released. If the device is paid for by, for example, the detainee completing a rent to own program, paying for the device outright, or originally owning the device, then the device is returned to the unconfigured state (Step 760) and the detainee may resume using the device in the outside world. Alternatively, if the device is not paid for, then the device is prepared for the next detainee (Step 765) by removing any personal data.

Figure 8:
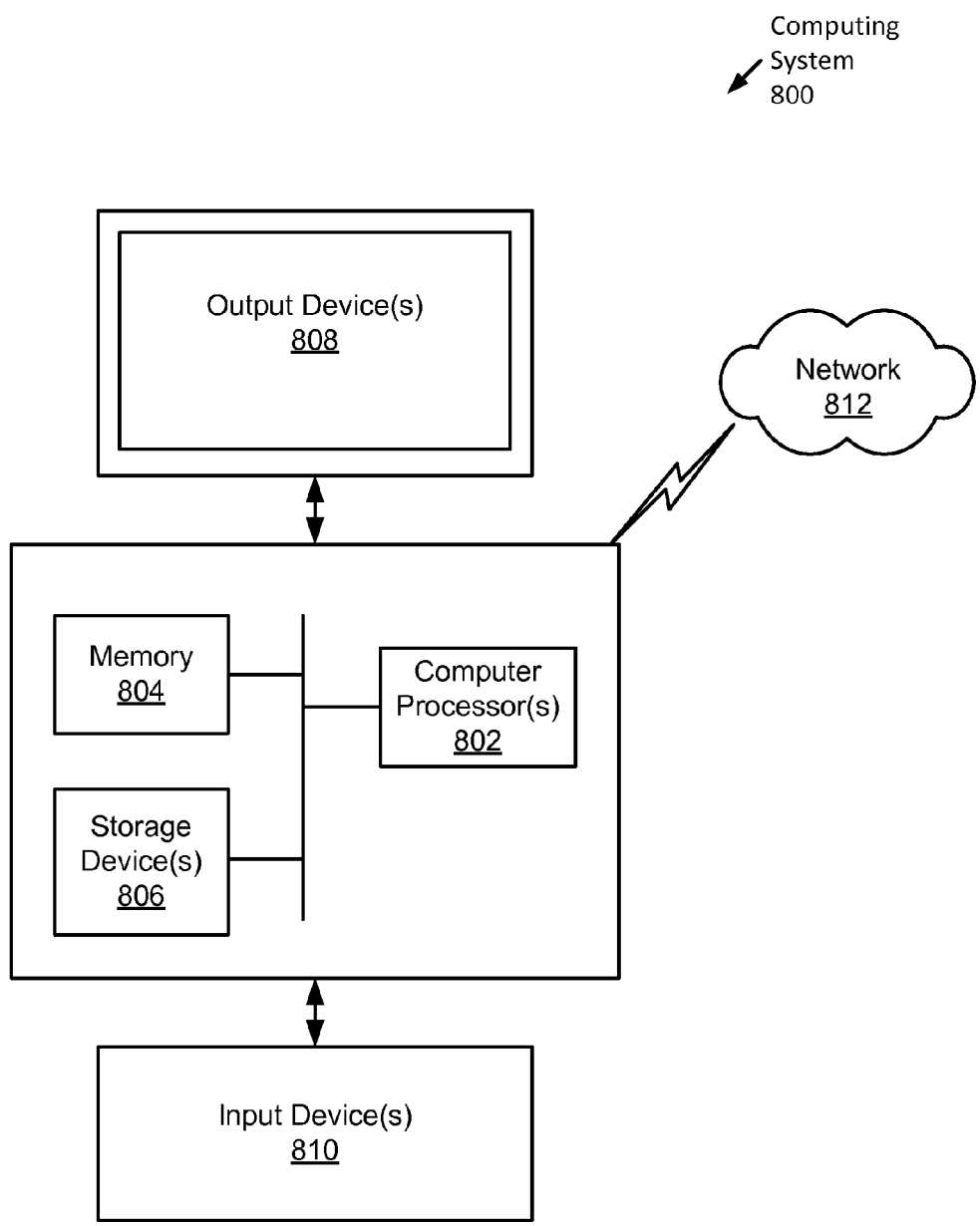
FIG. 8 shows a diagram of a computing system in accordance with one or more embodiments of the invention.

FIG. 8 shows a general computing system in accordance with one or more embodiments of the invention. As shown in FIG. 4, the computing system (800) may include one or more computer processor(s) (802), associated memory (804) (e.g., random access memory (RAM), cache memory, flash memory, etc.), one or more storage device(s) (806) (e.g., a hard disk, an optical drive such as a compact disk (CD) drive or digital versatile disk (DVD) drive, a flash memory stick, etc.), and numerous other elements and functionalities. The computer processor(s) (802) may be an integrated circuit for processing instructions. For example, the computer processor(s) may be one or more cores, or micro-cores of a processor. The computing system (800) may also include one or more input device(s) (810), such as a touchscreen, keyboard, mouse, microphone, touchpad, electronic pen, or any other type of input device. Further, the computing system (800) may include one or more output device(s) (808), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (800) may be connected to a network (814) (e.g., a local area network (LAN), a wide area network (WAN) such as the Internet, mobile network, or any other type of network) via a network interface connection (not shown). The input and output device(s) may be locally or remotely (e.g., via the network (812)) connected to the computer processor(s) (802), memory (804), and storage device(s) (806). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (800) may be located at a remote location and connected to the other elements over a network (814). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
    receiving, by a mobile application operating on a mobile device and from a server located at an access-restricted facility, a plurality of mobile device rules comprising location limitations on a usage of the mobile device within the access-restricted facility, wherein an inmate is subject to physical restrictions on movement within the access-restricted facility;
    restricting, by the mobile application and based on the plurality of mobile device rules, device use of the mobile device to the location limitations;
    communicating, by the mobile application to the server, to determine whether a payment has been made by a visitor using a kiosk located at the access-restricted facility; and
    providing, by the mobile application, to the inmate, and in response to the payment, access to the device use of the mobile device, wherein the kiosk acts as an endpoint for voice and video communication between the visitor and the inmate using the mobile device.

2. The method of claim 1, wherein the payment comprises a periodic rent payment.

3. The method of claim 2, wherein the periodic rent payment is part of a rent-to-own program.

4. The method of claim 1, wherein the voice and video communication is monitored by an administrator using an administrator computing device.

5. The method of claim 1, wherein the payment is received through use of a commissary account.

6. The method of claim 1,
    wherein the server removes, the plurality of mobile device rules from the mobile device, and
    wherein removing the mobile device rules returns the mobile device to an initial state.

7. The method of claim 1, wherein the payment comprises a fee for sending a message using the mobile device.

8. The method of claim 1, wherein the server renders the mobile device in a state that is not limited by the plurality of mobile device rules upon or after release of the inmate.

9. The method of claim 1, wherein the server removes all personal information from the mobile device after the mobile device is returned to an administrator.

10. A non-transitory computer-readable medium (CRM) storing a plurality of instructions, the plurality of instructions for:
    receiving, by a mobile application operating on a mobile device and from a server located at an access-restricted facility, a plurality of mobile device rules comprising location limitations on a usage of the mobile device within the access-restricted facility, wherein an inmate is subject to physical restrictions on movement within the access-restricted facility;
    restricting, by the mobile application and based on the plurality of mobile device rules, device use to the location limitations;
    communicating, by the mobile application to the server, to determine whether a payment has been made by a visitor using a kiosk located at the access-restricted facility; and
    providing, by the mobile application, to the inmate, and in response to the payment, access to the device use of the mobile device, wherein the kiosk acts as an endpoint for voice and video communication between the visitor and the inmate using the mobile device.

11. The non-transitory CRM of claim 10, wherein the payment comprises a periodic rent payment.

12. The non-transitory CRM of claim 11, wherein the periodic rent payment is part of a rent-to-own program.

13. The non-transitory CRM of claim 10, wherein the voice and video communication is monitored by an administrator using an administrator computing device.

14. The non-transitory CRM of claim 10, wherein the payment is received through use of a commissary account.

15. The non-transitory CRM of claim 10, the instructions further comprising functionality to:
    remove the mobile application, wherein removing the mobile application returns the mobile device to an initial state.

16. The non-transitory CRM of claim 10, wherein the payment comprises a fee for sending a message using the mobile device.

17. A system, comprising:
a mobile device comprising a mobile application operating on the mobile device, the mobile application configured for:
receiving a plurality of mobile device rules for the mobile device, wherein the plurality of mobile device rules comprise location limitations on a usage of the mobile device within an access-restricted facility, wherein an inmate is subject to physical restrictions on movement within the access-restricted facility,
restricting, based on the plurality of mobile device rules, device use to the location limitations,
communicating, by the mobile application to the server, to determine whether a payment has been made by a visitor using a kiosk located at the access-restricted facility, and
providing, by the mobile application, to the inmate, and in response to the payment for usage of the mobile device, access to the device use of the mobile device, wherein the kiosk acts as an endpoint for voice and video communication between the visitor and the inmate using the mobile device;
the kiosk at the access-restricted facility configured for:
processing the payment by a visitor for the usage of the mobile device;
and
the server coupled to the kiosk and configured for:
determining the plurality of mobile device rules, and
sending, to the mobile device, the plurality of mobile device rules.

18. The system of claim 17, wherein the payment comprises a periodic rent payment.

19. The system of claim 18, wherein the periodic rent payment is part of a rent-to-own program.

20. The system of claim 17, wherein the voice and video communication is monitored by an administrator using an administrator computing device.

21. The system of claim 17, wherein the payment is received through use of a commissary account.

22. The system of claim 17, wherein the mobile device further comprises functionality to:
remove the mobile application, wherein removing the mobile application returns the mobile device to an initial state.

23. The system of claim 17, wherein the server renders the mobile device in a state that is not limited by the plurality of mobile device rules upon or after release of the inmate.

24. The system of claim 17, wherein the mobile device is returned to an administrator and all personal information is removed from the device.

25. The system of claim 19,
wherein the server further comprises functionality to determine whether a total amount paid by the inmate is less than a predetermined amount required for owning the mobile device, and
wherein the mobile application further comprises functionality to, in response to determining the total amount paid by the inmate is less than the predetermined amount required for owning the mobile device, restrict access to the mobile device by the inmate.

26. The system of claim 20, wherein the mobile device is reconfigured by the mobile application for compatibility with a facility system that manages the access-restricted facility.

27. The system of claim 17, wherein the mobile device rules comprise rules for transitioning the mobile device to the inmate after the inmate is released from the access-restricted facility.

* * * * *